Aug. 4, 1970  R. C. SCHNECK, JR  3,522,950
PISTON AND PTFE RING ASSEMBLY FOR INTERNAL
COMBUSTION ENGINES
Filed Nov. 13, 1967
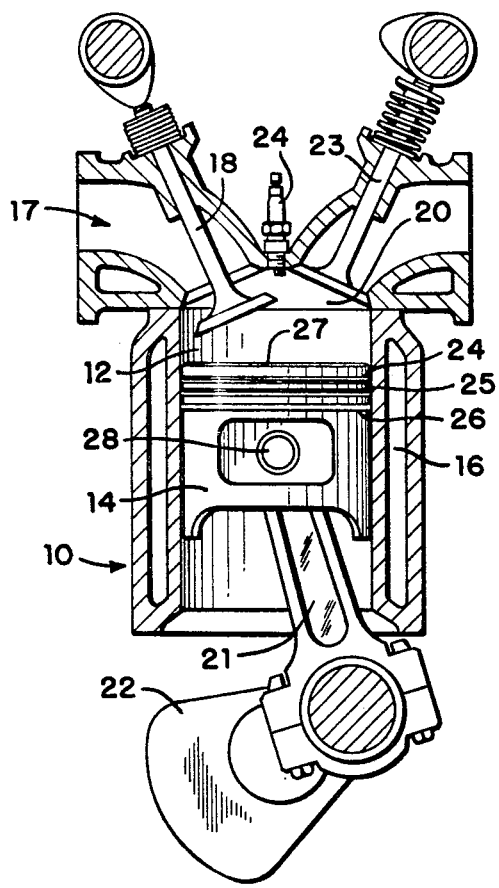
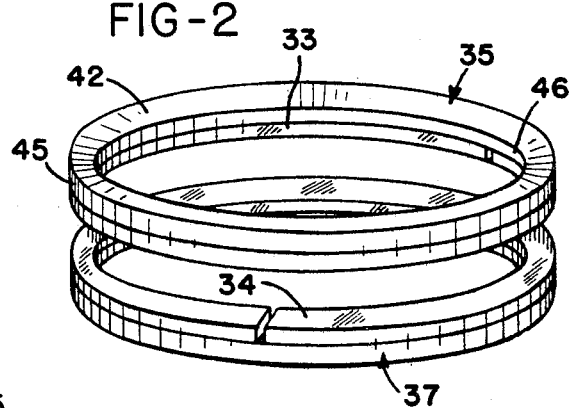
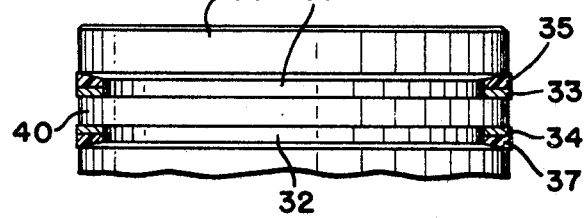
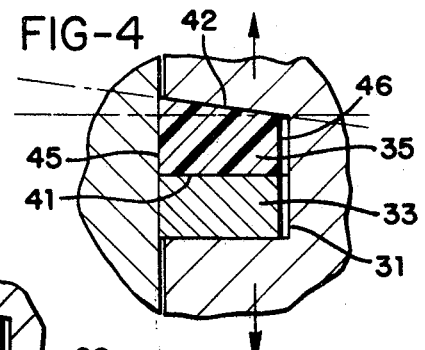
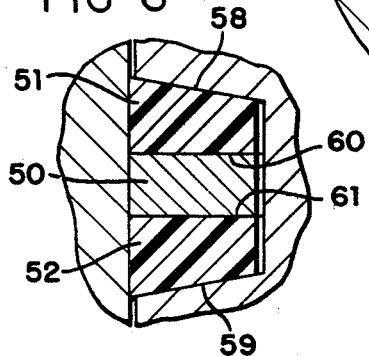
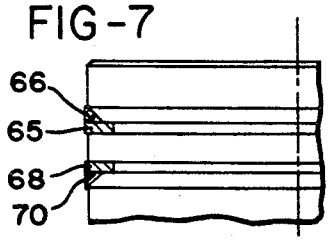
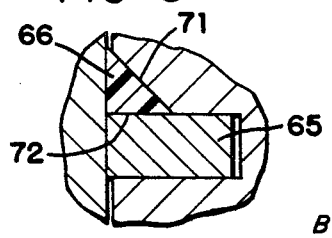
INVENTOR
ROBERT C. SCHENCK, Jr.
BY
Marechal, Biebel, French & Bugg
ATTORNEYS United States Patent Office 3,522,950
Patented Aug. 4, 1970

3,522,950
PISTON AND PTFE RING ASSEMBLY FOR
INTERNAL COMBUSTION ENGINES
Robert C. Schneck, Jr., Dayton, Ohio, assignor to The
Duriron Company, Inc., Dayton, Ohio, a corporation
of New York
Filed Nov. 13, 1967, Ser. No. 682,156
Int. Cl. F16j 9/00
U.S. Cl. 277—170                              6 Claims

ABSTRACT OF THE DISCLOSURE

A continuous compression seal ring of filled polytetrafluoroethylene is used in conjunction with a standard metallic piston ring for conformationally engaging the cylinder to reduce blowby. The seal ring is triangular or trapezoidal in cross-section and urged into sealing engagement with the piston and cylinder by the standard metallic piston ring during reciprocating movement of the piston.

FIELD OF INVENTION

This invention relates to a piston and ring assembly for an internal combustion engine and more particularly to an improved piston and ring assembly utilizing filled fluorocarbon wedge rings as auxiliary compression seal rings.

DESCRIPTION OF THE PRIOR ART

Various approaches have been taken to adapt polytetrafluoroethylene (PTFE) for use as an element in piston rings for compressors, and in internal combustion engines, for example, gasoline and diesel engines. U.S. Pat. No. 2,807,511 issued Sept. 24, 1957 describes a metallic split piston ring in which the outer cylinder side surface of the ring is coated with PTFE, the coating being relatively thin and not exceeding 0.007" thickness. The purpose of the coating is to reduce friction thereby decreasing wear and increasing engine efficiency. U.S. Pat. No. 2,817,562 issued Dec. 24, 1957, describes a piston wherein the side walls or skirts and the face of the piston include a coating of PTFE, the coating being relatively thin and not exceeding 0.007" thickness. Again, the purpose of the coating on the side walls or skirts is to reduce friction thereby decreasing wear and increasing engine efficiency. The face of the piston is coated with a relatively thin PTFE coating to prevent deposition of carbonaceous material on the piston face.

The Journal of Teflon [1], volume 7, No. 7 of November 1966, describes a glass filled PTFE piston ring for use in diesel engines. Glass filled PTFE was used because rings of the filled resin appeared to have the necessary strength, durability and seal characteristics. The rings used were split, step-cut compression rings mounted on a piston in combination with steel expander rings positioned concentrically within the compression rings to force them against the cylinder wall. Several different tests are described in which glass filled PTFE rings were substituted for one or more conventional cast iron rings in a diesel engine.

In the Journal of Teflon [1], volume 2, No. 10 of October 1961, piston rings for compressors and rod packings are described wherein the rings are PTFE filled with glass, carbon or metallic powders. Several different ring structures are described including split-butt-joint, step-cut, and segmented piston rings, all formed of filled PTFE.

"Fluor" Engineering News No. 664 of Imperial Chemical Industries, Ltd., describes filled PTFE rings for compressors used in cryogenic refrigerators. The object in using PTFE is to eliminate the use of lubricating oils which act as a contaminant.

In the design of piston and ring assemblies for modern high compression engines, precautions are taken to reduce oil consumption and reduce crankcase emissions resulting from blowby. Various approaches have been taken including use of different piston ring configurations with faces of various materials such as molybdenum and chromium, refining the bore finish and using rings of different configuration and having special facings which are disposed axially along the piston. Automotive engines generally utilize three ring pistons, the two upper rings being compression rings while the third is an oil ring. The compression rings are designed to prevent excessive gas leakage past the piston and to aid the oil control ring in preventing excessive oil consumption.

Various compression ring designs have been used and are proposed for modern automative engines, and reference is made to "Automotive Piston Rings 1967—State of the Art" published by the Society of Automotive Engineers as Release No. 670019. Reference is made thereto for consideration of various configurations and facings utilized in the design of piston rings.

Even with the progress being made in piston ring design, there is considerable concern because of emissions created by blowby, that is, passage of exhaust gases around the piston and ring assembly and into the crankcase and release of these chemical products into the atmosphere through the breather tube on the crankcase. Attempts to eliminate crankcase emissions have resulted in the use of a by-pass tube which is connected between the breather tube and the intake manifold so that the combustible products from the crankcase are substantially completely consumed.

Even with piston and ring assemblies which are carefully designed with respect to the cylinder into which they are to be received, there are inevitably areas, during the stroke of the piston, in which there is incomplete sealing either because of flat spots or out-of-round spots either on the piston ring or cylinder wall. Additionally, the conventional piston rings are split and of the expander type and have a tendency to "float" as the piston changes direction during the cycle. As a result of the combination of the split ring, slight mismatch between the piston ring and bore, and the leakage path present as a result of the floating condition of the rings, blowby and crankcase emissions have become a major air polution problem.

SUMMARY OF THE INVENTION

Accordingly, it is a primary object of the present invention to provide a piston and ring assembly for an internal combustion engine utilizing as an auxiliary compression ring an annular continuous wedge ring of fluorocarbon resin in order to provide a seal preventing blowby while preventing passage of lubricating oil into the combustion chamber.

Another object of the present invention is the provision of an auxiliary compression ring for use with a piston in an internal combustion engine wherein the wedge ring is of filled PTFE and cooperates with standard metallic compression rings for substantially reducing the passage of combustion gases into the crankcase.

A further object of the present invention is the use of wedge-shaped auxiliary compression rings in cooperation with standard metallic compression rings wherein the auxiliary rings are received in conformational sealing engagement with the cylinder wall during reciprocating movement of the piston.

These and other objects of the present invention have been achieved by the provision of a piston ring of PTFE which is continuous in nature, that is, free from radial

[1] Registered trademark E. I. du Pont de Nemours and Co., Inc.

seams or joints, so that there is no path for leakage. The piston ring is preferably an auxiliary compression ring of wedge-shaped and cooperates with a conventional metallic ring wherein the metallic ring operates to wedge the auxiliary ring into sealing engagement with the cylinder wall and the piston ring groove during reciprocating movement of the piston. Since the auxiliary seal ring is of PTFE, there is little, if any, abrasive wear of the ring against the cylinder wall.

Each of the auxiliary compression rings in accordance with the present invention includes a continuous outer peripheral face which conformationally engages the cylinder wall because of the radially outwardly directed force created by its wedge configuration. The auxiliary ring also includes a pair of continuous annular surfaces one of which seals against the piston body and the other of which seals against the standard metallic compression ring. One or more such rings may be used on a piston, and one or more rings may be used in each compression ring groove. The wedge rings operate to reduce substantially the amount of blowby and to effect substantial reduction in the amount of oil which by-passes the compression ring to reach the combustion chamber.

BRIEF DESCRIPTION OF THE DRAWINGS

FIG. 1 is a view of a portion of a conventional automotive engine;

FIG. 2 is an isometric view of the compression ring assembly in accordance with the present invention;

FIG. 3 is a view partly in section and partly in elevation of the ring assembly of FIG. 2 mounted in a piston;

FIG. 4 is a fragmentary enlarged view of the compression ring to reach the combustion chamber. engagement with the cylinder wall;

FIG. 5 is a fragmentary view partly in section and partly in elevation of a compression ring assembly utilizing two auxiliary compression rings in each groove;

FIG. 6 is an enlarged fragmentary view, similar to FIG. 4, of the ring assembly shown in FIG. 5;

FIG. 7 is a fragmentary view partly in section and partly in elevation of a compression ring assembly wherein the auxiliary compression ring is triangular in cross-section; and FIG. 8 is an enlarged fragmentary view, similar to FIG. 4, of the compression ring assembly shown in FIG. 7.

DETAILED DESCRIPTION OF THE INVENTION

Referring to FIG. 1, a portion of a four-stroke automotive engine is shown which includes a cylinder block 10 with a cylinder 12 and received within the cylinder is a reciprocating piston 14. Surrounding the cylinder 12 is a water jacket 16 with coolant liquid being circulated around the cylinder. As is conventional, a fuel mixture is introduced through an intake manifold 17 and passes around an intake valve 18 into the combustion chamber 20. Mounted on the piston is a connecting rod 21, the other end of the connecting rod being mounted on a crankshaft 22.

Four stroke engines include a downward fuel and intake stroke, an upward compression stroke at which time a spark plug 24 is activated to ignite the fuel mixture; a downward power stroke and an upward exhaust stroke at which time an exhaust valve 23 is opened while the intake valve 18 is closed to permit passage of the exhaust gases into a conventional exhaust manifold.

Piston 14 includes two annular compression ring grooves 24 and 25 and an oil ring groove 26, grooves 24 and 25 receiving compression conventional rings while groove 26 receives an oil ring, all of these grooves being between the head 27 and the connecting rod joint 28. The compression rings operate to provide a seal between the cylinder wall 12 and the piston 14 in order to prevent, as much as possible, passage of the exhaust gases around the outer periphery of the piston 14. These rings also are conventionally designed to reduce as much as possible passage of oil into the combustion chamber 20. The oil ring functions essentially as a wiper ring to force oil back into the crankcase (not shown) during each downward stroke of the piston.

A ring assembly constructed in accordance with the present invention is shown in FIGS. 2–4, and for the purpose of explanation, the piston 30 is shown as including two compresssion ring grooves 31 and 32, and it is understood that depending on the nature of the engine, an oil ring groove may also be included. Received in each of the grooves 31 and 32 is a conventional annular metallic split type compression ring 33 and 34, respectively and an associated auxiliary compression ring 35 and 37. Each of rings 35 and 37 is annular and continuous in nature, that is, free of radial seams and joints. These rings are made of fluorocarbon resin such as PTFE which is filled with any of the conventional filler materials previously described supra. By way of example, and not to be construed as a limitation on this invention, the rings 35 and 37 contain 55% by weight of 325 mesh cast iron powder. Even with this amount of filler, the auxiliary rings are sufficiently conformable to the cylinder bore to be urged into tight sliding sealing engagement.

The metallic compression rings 33 and 34 are assembled in the respective compression ring grooves and so positioned with respect to each other that they are separated by a compression land 40. Positioned between the top of the piston 30 and ring 33 is the auxiliary ring 35, while auxiliary ring 37 is positioned between ring 34 and the lower end of the piston. Each of the rings 35 and 37 is trapezoidal in cross-sectional configuration and thus each acts as a wedge ring in association with the corresponding metallic ring.

The rings 35 and 37 are identical in configuration and cooperate with the respective metallic rings in essentially the same way and thus will be explained with reference to FIG. 4. The ring 35 includes a continuous annular surface of the piston. The outer peripheral surface 45 of posed surface of the metallic ring 33. The other generally radially disposed surface 42 of ring 35 is inclined or tapered to form a wedge, and seals against the opposed surface of the piston. The outer peripheral surface 45 of the ring 35 is longer in its axial dimension than the inner surface 46 and is in conformational sealing engagement with the cylinder wall. Since rings 35 and 37 are of PTFE, each of the sealing surfaces thereof conform to the contour of the opposed mating surface thereby providing a relatively efficient seal.

Illustrative of the relative dimensions of the various components of the piston and ring seal assembly shown in FIGS. 2–4, the piston diameter is about 2.300″ while the cylinder is of 2.312″ in diameter thus providing 0.006″ clearance between the piston and cylinder. As an example, the radial dimension of rings 35 and 37 as measured along face 41 may be some uniform dimension in the range of 0.090″ to 0.140″ so as to provide a few thousandths interference fit with respect to the cylinder. With the dimensions previously given, a ring of radial dimension of .133″ and a .020″ clearance between the inner surface 46 and the base of the groove, there is provided an interference fit of about .003″. It is of course understood that these dimensions may be varied depending on the desired radial dimension of the auxiliary ring. The clearance between surface 46 and the base of the groove provides expansion space for the PTFE in the event of substantial increases in temperature.

One of the advantages of the ring structure of the present invention is the substantial elimination of leakage around the rings due to the "floating" condition of the rings as the piston changes direction. As the piston moves upwardly, the lower ring 37 is sealed to the piston along the annular tapered face while also forcing the ring outwardly in a radial direction in conformational sealing relation with the cylinder wall. The upper ring 35 is sealed against the bore wall because of its tapered configuration although the sealing pressure along the tapered face as the ring moves upwardly may not be as great as the sealing pressure of the tapered face of the lower ring. As the piston changes direction and moves downwardly, the situation is the reverse in that the tapered face of the upper ring 35 is at a high unit sealing pressure and urged radially outwardly against the cylinder wall because of its tapered configuration while a seal exists between the outer periphery of the lower ring 37 and the cylinder wall. Further, there is a seal provided between the tapered face of the lower ring 37 and the opposed portion of the piston. During the change in direction, the radially outwardly directed force assists substantially in establishing and maintaining a seal between the outer periphery of the auxiliary seal rings and the cylinder wall in addition to the seal provided by the standard compression rings.

As the piston changes direction from an upward to a downward stroke, pressure which passes between the piston and cylinder wall from the cylinder head also assists in establishing a seal by acting on the inclined surface of the top ring, and if any pressure bypasses both of the top rings, then its acts on ring 34 to force it down against ring 37, the latter being tapered and urged radially outwardly.

The ring structure shown in FIGS. 5 and 6 utilizes a standard upper metallic ring 50 with a pair of tapered auxiliary seal rings 51 and 52 received in a ring groove 55. A second ring groove 57 receives another set of rings 50a, 51a and 52a corresponding substantially to rings 50, 51 and 52. As shown in FIG. 6, which for purposes of description shows only the upper rings 50, 51 and 52, each of the auxiliary rings 51 and 52 is similar in configuration to rings 35 and 37, and the rings are so disposed with respect to ring 50 that the respective tapered surfaces 58 and 59 are in sealing relationship with the piston while the flat surfaces 60 and 61 are in sealing relation with the opposed surfaces of the standard metallic ring 50.

The structure shown in FIGS. 5 and 6 offer the advantage of a plurality of auxiliary rings associated with each standard metallic ring for use in internal combustion engines which develop substantially high head pressures.

FIGS. 7 and 8 illustrate another form of the present invention in which a standard metallic ring 65 has associated therewith a triangular-shaped auxiliary sealing ring 66. A lower standard metallic ring 68 also has associated with it an auxiliary sealing ring 70 which is of a configuration substantially the same as the configuration of auxiliary ring 66. The operation of the rings shown in FIGS. 7 and 8 is essentially the same as the operation of the rings previously described in that the tapered surface 71 of each of the auxiliary rings is sealed against the piston while the flat surface 72 of each of the auxiliary rings is sealed against the flat surface of the corresponding standard metallic ring. Again, the effect of providing opposed tapered surfaces on the piston and auxiliary ring is to urge the auxiliary ring radially outwardly against the cylinder wall for conformational sealing engagement therewith as the piston moves up and down.

In tests utilizing the rings above described, and particularly of the ring structure shown in FIGS. 7 and 8, an engine was run with a pressure monitoring device attached to the breather tube to the crankcase. In a test using standard metallic piston rings without the auxiliary rings of the present invention, the engine was run and the pressure in the crankcase as measured by a manometer indicated a pressure equal approximately to 18 feet of water almost immediately after engine start up. The same engine was disassembled and the piston replaced with pistons utilizing the auxiliary sealing rings of the present invention, and after a period of operation of approximately ten minutes the manometer reading was equivalent to approximately 1.5 feet of water, having gradually raised from a reading of zero feet. The pressure leveled off at approximately 1.5 feet and remained at that pressure for the remaining portion of the test. The engine used in the test was a four cycle 2¼ horsepower Clinton engine. After the test of the piston and ring structure in accordance with the present invention, the engine was disassembled and examined and there was little evidence of wear on the rings or the cylinder wall, and it was also noted that oil consumption was somewhat reduced when using the auxiliary seal rings of the present invention. The mean temperature of operation was between 350° and 450° F. and the PTFE rings operated satisfactorily at this relatively high temperature.

The conformational sealing engagement with the auxiliary sealing rings and the cylinder wall in part assisted substantially in reducing blowby as indicated by the low pressure reading from the breather tube when using the piston rings in accordance with the present invention.

Another advantage of the auxiliary ring structure in accordance with the present invention is the fact that in the event that the engine runs abnormally hot, or at a temperature sufficiently high to carbonize the PTFE rings, the seal between the piston and the cylinder wall is retained because of the presence of the standard metallic seal rings.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a piston and ring assembly for use in an internal combustion engine wherein a piston includes a head and a cylindrical body portion having means for mounting the piston on a connecting rod for reciprocating movement in a cylinder, said body portion of said piston including at least one compression ring groove between said head and said means for connecting a rod, a metallic compression ring received in said groove, said metallic compression ring including radially disposed spaced faces which are in essentially parallel relationship, the improvement comprising at least one auxiliary compression ring associated with said metallic compression ring, said ring groove including at least one radially disposed inclined face, said auxiliary compression ring being a continuous annular wedge ring of a filled fluorocarbon resin and having an inner peripheral dimension less than the outer peripheral dimension of the ring groove but greater than the peripheral dimension of the base of said ring groove thereby forming a space between the inner peripheral surface of said wedge ring and the base of said groove, the said auxiliary compression ring including a continuous generally annular surface portion in sealing engagement with the opposed surface of the corresponding compression ring for providing a continuous gas seal therewith during reciprocating movement of said piston and an inclined face in sealing engagement with the radially inclined face of said ring groove during reciprocating movement of said piston, and the said auxiliary compression ring including a continuous outer peripheral surface free of radial seams and joints and having a dimension measured axially which is greater than the axial dimension of the inner periphery for reception in conformational gas sealing relation with a cylinder.

2. A piston and ring assembly as set forth in claim 1 wherein said piston includes two axially spaced compression ring grooves each of which receives a metallic compression ring, and wherein said metallic compression rings and said auxiliary compression rings are so arranged that said auxiliary compression rings are spaced from each other by said metallic compression rings.

3. A piston and ring assembly as set forth in claim 1 wherein said fluorocarbon resin is filled polytetrafluoroethylene.

4. A piston and ring assembly as set forth in claim 1 wherein two auxiliary compression rings and one metallic compression ring are received in each compression ring groove, and each auxiliary compression ring including a face in sealing relation with the opposed faces of said metallic compression ring.

5. A piston and ring assembly as set forth in claim 1 wherein said auxiliary ring is trapezoidal in cross-section.

6. A piston and ring assembly as set forth in claim 1 wherein the said metallic compression ring operates as an expander during movement of said piston to urge the corresponding auxiliary ring into sealing engagement with said piston and cylinder, and wherein the said auxiliary piston ring is of filled polytetrafluoroethylene.

References Cited

UNITED STATES PATENTS

| | | | |
|---|---|---|---|
| 1,348,641 | 8/1920 | Hachmann | 277—223 |
| 1,527,535 | 2/1925 | Bockwitz | 277—170 |
| 2,221,988 | 11/1940 | Morton | 277—223 |
| 2,908,537 | 10/1959 | Kipp | 277—223 |
| 2,328,390 | 8/1943 | Nelson | 277—144 |
| 2,376,147 | 4/1945 | Johnston | 277—144 |
| 2,973,978 | 3/1961 | Oppenheim | 277—188 |

FOREIGN PATENTS

| | | |
|---|---|---|
| 1,056,145 | 1/1967 | Great Britain. |
| 998,795 | 1/1952 | France. |

OTHER REFERENCES

Publication "Tests Try Teflon for Diesel Engine Piston Rings," pp. 6 and 7, The Journal of Teflon, vol. 7, No. 7 of November 1966.

DORSEY NEWTON, Primary Examiner

U.S. Cl. X.R.

277—144

PO-1050
(5/69)

UNITED STATES PATENT OFFICE
CERTIFICATE OF CORRECTION

Patent No. 3,522,950          Dated August 4, 1970

Inventor(s) Robert C. Schenck, Jr.

It is certified that error appears in the above-identified patent and that said Letters Patent are hereby corrected as shown below:

Column 1, line 3, "Schneck" should read --Scheneck--.
Column 3, lines 32, 33 and 34, should read --Fig. 4 is a fragmentary enlarged view of the compression ring assembly seated in a groove and in sealing engagement with the cylinder wall;--.
Column 4, line 40, should read --surface 41 which is in sealing engagement with the opposed--.

In the references:"Johnston 4/1945" should be --Johnston 5/1945--.

SIGNED AND
SEALED
OCT 27 1970

(SEAL)
Attest:

Edward M. Fletcher, Jr.
Attesting Officer

WILLIAM E. SCHUYLER, JR.
Commissioner of Patents

Notice of Adverse Decision in Interference

In Interference No. 97,741 involving Patent No. 3,522,950, R. C. Schenck, Jr., PISTON AND PTFE RING ASSEMBLY FOR INTERNAL COMBUSTION ENGINES, final judgment adverse to the patentee was rendered Aug. 31, 1972, as to claims 1, 2, 3, 4, 5 and 6.

[*Official Gazette October 31, 1972.*]

Notice of Adverse Decision in Interference

In Interference No. 97,741 involving Patent No. 3,522,950, R. C. Schenck, Jr., PISTON AND PTFE RING ASSEMBLY FOR INTERNAL COMBUSTION ENGINES, final judgment adverse to the patentee was rendered Aug. 31, 1972, as to claims 1, 2, 3, 4, 5 and 6.

[*Official Gazette February 6, 1973.*]

PO-1050
(5/69)

UNITED STATES PATENT OFFICE
CERTIFICATE OF CORRECTION

Patent No. 3,522,950          Dated August 4, 1970

Inventor(s) Robert C. Schenck, Jr.

It is certified that error appears in the above-identified patent and that said Letters Patent are hereby corrected as shown below:

Column 1, line 3, "Schneck" should be --Schenck--.

Signed and sealed this 3rd day of December 1974.

(SEAL)
Attest:

McCOY M. GIBSON JR.          C. MARSHALL DANN
Attesting Officer          Commissioner of Patents